Dec. 19, 1944.    W. L. HILL    2,365,269
COFFEE MAKER
Filed May 17, 1944
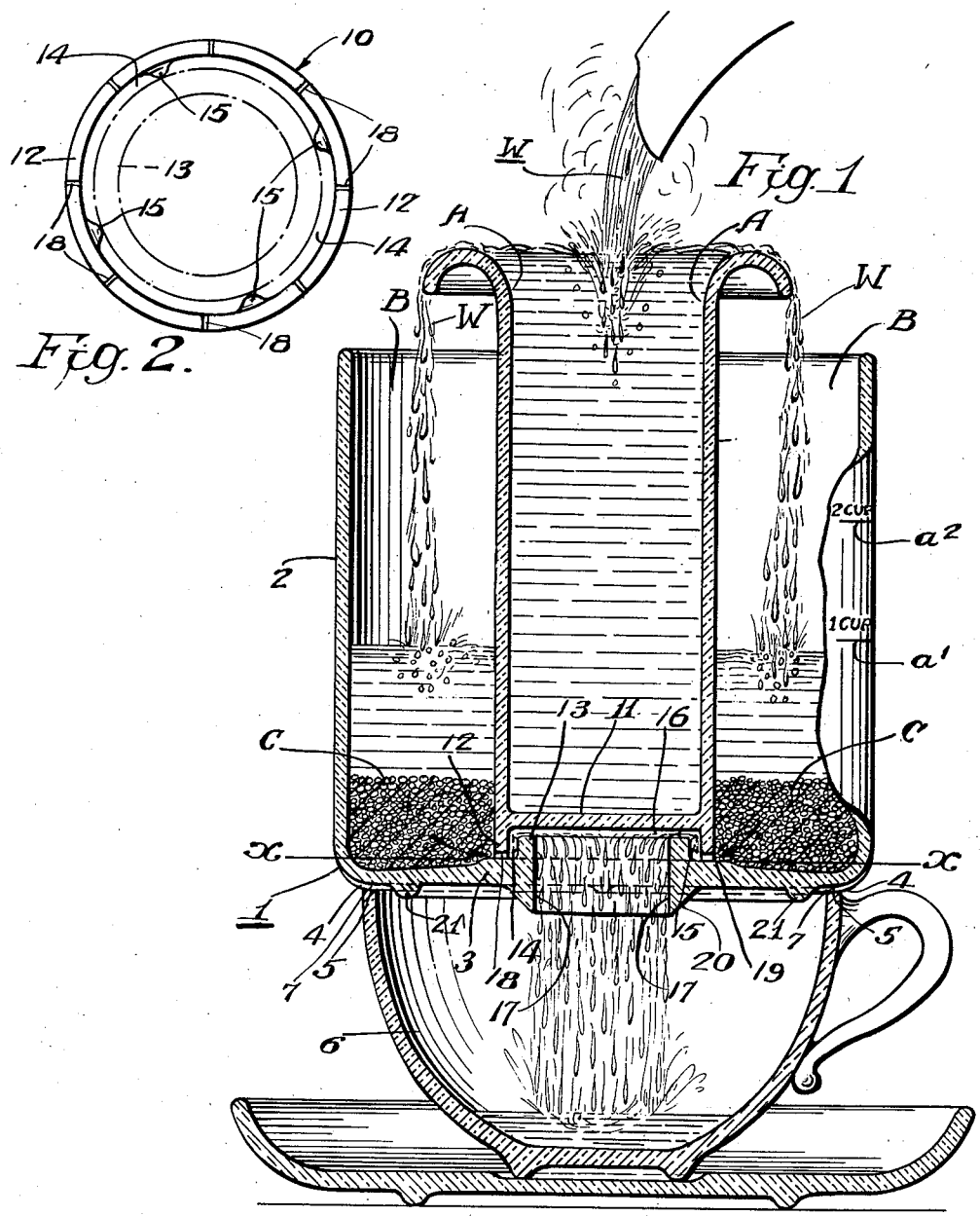
Inventor:-
Walter L. Hill
by his Attorneys
Howson + Howson Patented Dec. 19, 1944

2,365,269

UNITED STATES PATENT OFFICE 2,365,269

COFFEE MAKER

Walter L. Hill, Scranton, Pa.; Walter L. Hill, Jr., administrator of said Walter L. Hill, deceased Application May 17, 1944, Serial No. 535,977

6 Claims. (Cl. 99—305)

This invention relates to beverage making devices, and more particularly to a type wherein a basic liquid ingredient is permitted to seep through a porous bed of basic solid ingredient to extract a flavoring essence from the solid ingredient and effect transitional commingling thereof with the liquid ingredient, whereby the beverage is completed in a single passage of the liquid through the porous bed.

More specifically, the invention relates to a device for making coffee, wherein hot water is poured into an inner or central chamber of the device and caused to overflow therefrom into an outer concentric annular chamber in which a porous bed of prepared ground coffee has been placed. The overflowing water is permitted to seep through the bed of ground coffee and extract flavoring essence therefrom, and at the same time effect commingling of the coffee essence with the water, as the water passes through the bed of ground coffee. The resulting coffee beverage passes through a plurality of radial openings into and through a central discharge opening.

The principal object of the invention is to make the radial openings in the form of minute channels, between the seepage chamber and the central discharge opening of the device which, while permitting flow of the beverage to the central discharge opening, will prevent the passage of the coffee grounds therewith.

Another object of the invention is to form the inner chamber in a central receptacle as a separate part from the main receptacle in which the seepage chamber is formed, and to form the beverage channels in the bottom edge of a depending annular flange on the lower portion of the inner receptacle, which rests on a flat annular surface formed on the bottom of the main receptacle, around the central discharge opening, whereby said channels may be readily cleansed upon separation of the two receptacles one from the other.

The filling of the inner chamber to overflowing performs two functions, i. e. the hot water therein serves to keep the seeping liquid hot, whereby the finished beverage will be hot; and the weight of the water in the central chamber keeps the inner receptacle in place.

Other features of the invention and its construction and mode of operation will be fully disclosed hereinafter, reference being had to the accompanying drawing of which:

Fig. 1 is a longitudinal vertical sectional view showing a coffee maker made and operating in accordance with the present invention as being seated on the open top of a beverage cup and discharging the beverage directly into the cup; and Fig. 2 is an inverted plan view of the inner receptacle removed from the outer receptacle, to show the minute radial beverage channels exposed for cleansing.

As shown in Fig. 1, the device comprises a main outer receptacle 1, which, for convenience in manufacture, is preferably composed of tempered glass and provided with a straight cylindrical wall 2.

The under side of the transverse bottom 3 of the outer receptacle 1 is preferably provided with a plurality of short radial ribs 4 adapted to rest on the upper edge or rim 5 of a beverage drinking cup or other suitable container 6, into which the finished beverage flows from the device, said ribs providing suitable air channels 7 between the top edge 5 of the container 6 and the under surface of the bottom 3, to prevent the device from becoming airbound in course of operation. Free flowing of the beverage into the container may otherwise be retarded or completely stopped, should the escape of air from the container 6 be prevented as a result of air trapped in the container 6 building up a pressure therein which would prevent normal gravitational flow of the beverage thereinto.

The device also includes an inner supplementary receptacle 10, which is provided with a closed transverse bottom 11 below which is an annular depending axially extending flange 12. The down turned vertical flange 12 of the supplementary receptacle 10 is adapted to extend completely around an up-standing vertical flange 13, formed on the bottom 3 of the main outer receptacle 2.

An annular channel 14 is formed between the flanges 12 and 13 which are preferably held in radially spaced relation to each other by means of radially extending lugs 15 formed on one of said flanges and adapted to engage the other of said flanges, as clearly shown in Fig. 2, for the purpose of centering the one flange with respect to the other flange and maintaining the annular channel 14 therebetween.

As shown in Fig. 1, the under surface of the bottom 11 of the inner supplementary receptacle 10 is spaced above the upper edge of the flange 13 formed on the bottom 3 of the outer main receptacle 2, to provide a horizontal annular channel 16 between the upper portion of the vertical annular channel 14 and a central discharge opening 17 for the finished beverage formed in the bottom 3 of the main outer receptacle 2.

As shown in Figs. 1 and 2, the flat lower edge of the depending flange 12 of the inner receptacle 3 is provided with a plurality of minute radial grooves 18, 18, which preferably are of such cross-section shape and dimensions as to permit free flow of liquid therethrough and at the same time prevent the entrance thereinto of the smaller than average grains of ground coffee employed in the device.

As shown in Fig. 1, the bottom 3 of the outer receptacle 1 is provided with an annular flat bearing surface 19, in the plane x, x slightly elevated with respect to that portion of the inner surface of the bottom 3 which surrounds the outer edge of the horizontal annular elevated surface 19, with said surrounding surface sloping outwardly and downwardly toward the inner surface of the vertical wall 2 of the main receptacle 1.

In operation, the outer receptacle 1 is placed on an open-top container 6, with the inner complementary receptacle 10 in place, after which a bed C of ground granulated coffee, or other suitable solid beverage ingredient, is placed within the annular chamber B formed between the inside surface of the cylindrical wall 2 of the main or outside container 1 and the outside surface of the cylindrical wall of the inner or complementary receptacle 10.

Hot water W or other suitable basic liquid ingredient is then poured into the inner cylindrical chamber A, formed in the receptacle 10, until said inner chamber A is filled to overflowing.

The filling of the inner chamber A maintains the lower edge of the flange 12 of the inner receptacle 10 in contact with the elevated horizontal surface 19 of the bottom 3 of the outer receptacle 1 at all times during subsequent functioning of the device.

As shown in Fig. 1, the overflowing liquid W builds up to a predetermined level in the annular chamber B, above the annular porous bed C of the solid ingredient of the beverage, whereupon the liquid ingredient W seeps through the bed C and flows through the radial channels or grooves 18 into the lower end of the vertical annular channel 14. The liquid rises in the annular channel 14 and overflows into the horizontal annular channel 16, to fall through the opening 17, formed in the bottom 3, into the container 6.

As shown in Fig. 1, a central concentric annular portion 20 of the undersurface of the bottom 3 of the outer receptacle 1 is beveled, or the whole of said bottom surface may be pitched downwardly and inwardly for directing the liquid at all times toward the center of the container, to eliminate the possibilities of any of the liquid finding its way to the outer surface of the container 6.

An annular rib 21 may be provided on the undersurface of the bottom 3 of the outer receptacle 1, if desired, to lie within the open top of the container 6, to prevent undue lateral displacement of the receptacle 1 with respect to the container 6, in use.

As shown in Fig. 1, the receptacle 1 may have a capacity of 1, 2, 3 or more cups, and in order to eliminate overcharging of the receptacle 1, when the device is being used for making a single cup of coffee, and when the device is discharging directly into the cup, the outer surface of the receptacle 1 is provided with suitable indications a1, a2 etc. to the level of which the liquid in the receptacle 1 is brought, depending upon the quantity of beverage desired.

From the foregoing it will be clear that the minute entrance passages 18 in the bottom edge of the depending flange 12 of the inner receptacle 10, with the bottoms of said entrance passages formed by the flat surface 19 of said outer receptacle 1, are of such diminutive cross sectional areas as to exclude particles of the ground coffee or other solid ingredient from passing into the lower end of the vertical annular passage 14 and the horizontal annular passage 16 each of which are formed jointly by adjacent relatively spaced surfaces of the two readily separable receptacles, whereby such particles will not pass into and through the discharge orifice 19, and whereby, when said receptacles are completely separated one from the other all parts of all the beverage passages 18, 14, 16 and 19 will be readily accessible for cleaning.

While the outer receptacle 1 is preferably composed of molded tempered glass, the inner receptacle 2 is likewise preferably formed of the same material, however, either or both of the receptacles may be formed of any suitable metal, plastic, or other substance without departing from the spirit of the invention.

From the foregoing it will be clear that the hot liquid within the chamber A will radiate heat into the liquid in the annular chamber B, during seepage thereof through the bed C of solid ingredient, thus keeping the seeping liquid, and the resulting beverage falling into the container 6, hot, thereby overcoming one of the major objections to beverage makers of the drip type which are obtainable on the market at the present time.

I claim:

1. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, and beverage passages formed jointly by and between adjacent surfaces of said receptacles for conducting liquid ingredient seepage from said surrounding chamber to said orifice, said passages having entrances of such diminutive cross-sectional area as to exclude particles of said solid ingredient therefrom.

2. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, a depending flange on said inner receptacle, an upstanding flange on the bottom of said outer receptacle around said orifice and adapted to fit within said depending flange on said inner receptacle, and beverage passages formed jointly by and between adjacent surfaces of said receptacles including said flanges for conducting liquid ingredient seepage from said surrounding chamber to said orifice.

3. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, a depending flange on said inner receptacle, an upstanding flange on the bottom of said outer receptacle around said orifice and adapted to fit within said depending flange on said inner receptacle, and beverage passages formed jointly by and between adjacent surfaces of said receptacles including said flanges for conducting liquid ingredient seepage from said surrounding chamber to said orifice, said passages having entrances of such diminutive cross sectional area as to exclude particles of said solid ingredient therefrom.

4. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, an upstanding flange on the bottom of said outer receptacle around said orifice, a flat annular surface on said outer receptacle bottom surrounding said upstanding flange, a depending flange on said inner receptacle with the lower edge of the depending flange resting on said flat annular surface, and a plurality of minute radial grooves formed in the lower edge of said depending flange and together with said flat annular surface forming passages for liquid ingredient seepage from said surrounding chamber to pass to said orifice.

5. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, an upstanding flange on the bottom of said outer receptacle around said orifice, a flat annular surface on said outer receptacle bottom surrounding said upstanding flange, a depending flange on said inner receptacle with the lower edge of the depending flange resting on said flat annular surface, and a plurality of minute radial grooves formed in the lower edge of said depending flange and together with said flat annular surface forming passages for liquid ingredient seepage from said surrounding chamber to pass to said orifice, said outer receptacle bottom having an upper surface sloping downwardly and outwardly from the outer marginal edge of said flat annular surface.

6. A beverage maker, comprising an outer receptacle including an integral bottom provided with a central beverage discharge orifice, an inner receptacle including a closed bottom and loosely mounted in and on the bottom of said outer receptacle over said orifice, a chamber for receiving a porous bed of solid ingredient surrounding said inner receptacle, a chamber formed in said inner receptacle for receiving a liquid ingredient to overflow into said surrounding chamber and seep through said bed, an upstanding flange on the bottom of said outer receptacle around said orifice, a flat annular surface on said outer receptacle bottom surrounding said upstanding flange, a depending flange on said inner receptacle with the lower edge of the depending flange resting on said flat annular surface, and a plurality of minute radial grooves formed in the lower edge of said depending flange and together with said flat annular surface forming passages for liquid ingredient seepage from said surrounding chamber to pass to said orifice, said outer receptacle bottom having an upper surface sloping downwardly and outwardly from the outer marginal edge of said flat annular surface, and an under surface sloping downwardly and inwardly toward said orifice.

WALTER L. HILL.